United States Patent [19]

Kato et al.

[11] Patent Number: 4,694,794

[45] Date of Patent: Sep. 22, 1987

[54] METHOD AND DEVICE FOR CONTROL OF INTERNAL COMBUSTION ENGINE VARIABLE SWIRL AIR FUEL INTAKE SYSTEM WITH DIRECT HELICAL INTAKE PASSAGE

[75] Inventors: Kenji Kato; Soichi Matsushita; Kiyoshi Nakanishi, all of Toyota, Japan

[73] Assignee: Toyota Jidosha Kabushiki Kaisha, Aichi, Japan

[21] Appl. No.: 865,655

[22] Filed: May 16, 1986

Related U.S. Application Data

[63] Continuation of Ser. No. 681,681, Dec. 14, 1984, abandoned.

[30] Foreign Application Priority Data

Aug. 20, 1984 [JP] Japan .................................. 59-173008

[51] Int. Cl.$^4$ ............................................ F02M 25/06
[52] U.S. Cl. ..................................................... 123/306
[58] Field of Search ................ 123/302, 306, 307, 308

[56] References Cited

U.S. PATENT DOCUMENTS

| | | | |
|---|---|---|---|
| 3,035,558 | 5/1962 | Wiebicke | 123/306 |
| 4,354,463 | 10/1982 | Otani | 123/306 |
| 4,438,741 | 3/1984 | Okumura | 123/307 |
| 4,465,034 | 8/1984 | Tsutsumi | 123/306 |
| 4,466,398 | 8/1984 | Nakanishi | 123/306 |
| 4,467,749 | 8/1984 | Maeda | 123/306 |
| 4,467,750 | 8/1984 | Isogai | 123/306 |
| 4,470,386 | 9/1984 | Okumura | 123/306 |
| 4,499,868 | 2/1985 | Kanda | 123/307 |

FOREIGN PATENT DOCUMENTS

| | | | |
|---|---|---|---|
| 58-23224 | 3/1981 | Japan | 123/307 |
| 57-165629 | 12/1982 | Japan | 123/307 |

Primary Examiner—Ronald B. Cox
Attorney, Agent, or Firm—Parkhurst & Oliff

[57] ABSTRACT

An air-fuel mixture intake system of an internal combustion engine includes a helical passage and a straight passage for conducting the air-fuel mixture to an intake port of the engine, the straight passage being selectively closed by a straight passage switchover control valve. A control device for operating the straight passage switchover control valve comprises a valve drive system including a diaphragm adapted to be actuated by intake vacuum of the engine, a vacuum switching valve for selectively either connecting the diaphragm to the intake manifold or releasing the diaphragm to the atmosphere, and a one way valve provided between the vacuum switching valve and the intake manifold so as to hold vacuum on one side thereof toward the diaphragm. Also included is a control system which switches the vacuum switch valve so as to release the diaphragm to the atmosphere when throttle opening increases beyond a certain determinate value thereby to open the straight passage, and which switches the vacuum switching valve so as to connect the diaphragm to the intake manifold when the level of intake vacuum present in the intake manifold rises above a certain determinate level thereby to close the straight passage.

1 Claim, 4 Drawing Figures

FIG. I
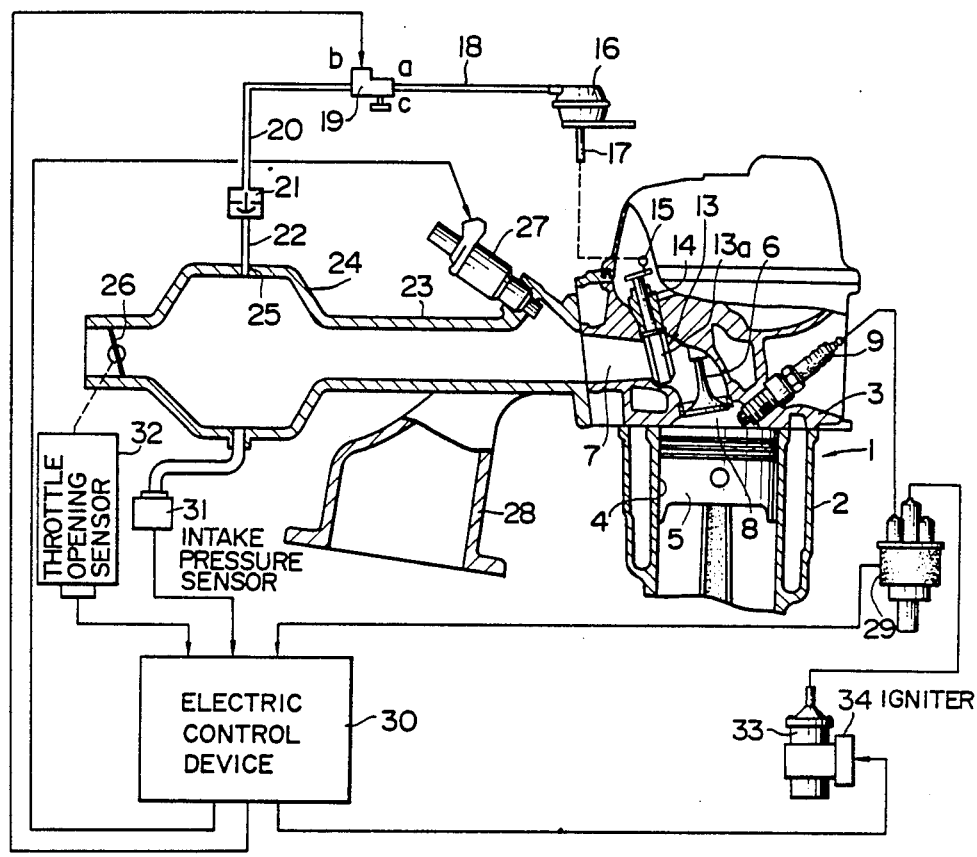
FIG. 2
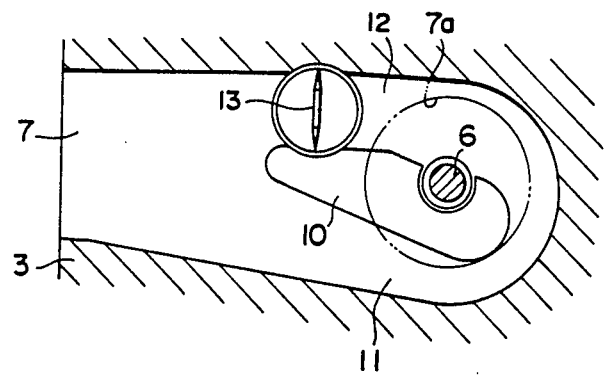

ic efficiency is much higher. Thus, in the above-identified previous applications, a general form of control method for the intake control valve has been to close it in the engine operational region from low to medium load, so as to substantially eliminate flow through said straight intake passage and to concentrate flow in said helical intake passage and so as to provide high swirling for the gases entering the combustion chamber, whereby in the low to medium load engine operational state the engine can be operated on a very high air/fuel ratio of about 18 to 20 or so—close to the maximum combustible air/fuel ratio; while on the other hand in the engine operational region from medium to high load it has been practiced to provide low swirling for the gases entering the combustion chamber by opening said intake control valve, so as to promote flow through said straight intake passage while reducing the amount of flow through said helical intake passage, and so as to increase volumetric efficiency, while of course the

METHOD AND DEVICE FOR CONTROL OF INTERNAL COMBUSTION ENGINE VARIABLE SWIRL AIR FUEL INTAKE SYSTEM WITH DIRECT HELICAL INTAKE PASSAGE

This is a continuation of application Ser. No. 681,681, filed Dec. 14, 1984, now abandoned.

BACKGROUND OF THE INVENTION

The present invention relates to a method and device for control of an air - fuel intake system for an internal combustion engine, and more specifically relates to a method and device for control of an air - fuel intake system for an internal combustion engine which includes an intake port construction including both direct and helical intake passages, wherein the relative amounts of intake pass through said direct intake passage and said helical intake passage can be varied. In particular, the present invention relates to control of such an air - fuel intake system, in which said control by variation of the relative amounts of intake flow which pass through said direct intake passage and said helical intake passage is performed by a drive means which is actuated by selective supply of vacuum taken from intake manifold vacuum.

The present patent application has been at least partially prepared from material which has been included in Japanese Patent Application No. Sho 59-173008 (1984), which was invented by the same inventors as the present patent application, and the present patent application hereby incorporates the text of that Japanese Patent Application and the claim or claims and the drawings thereof into this specification by reference; a copy is appended to this specification.

There are some types of variable swirl intake port construction for an internal combustion engine, which have been developed by the present inventors and/or their colleagues in the works of the assignee of the present application previously to the development of the present invention, for the inventive concepts of which Japanese patent application Ser. Nos. 56-51149 (published as Japanese Patent Laying-Open Publication No. 57-165629) and 56-120634 (published as Japanese Patent Laying-Open Publication No. 58-23224) were filed previously to the filing of the Japanese Patent Application relating to the present invention of which priority is being claimed in the present application, and for said inventive concepts of which it is known to the present inventors that U.S. patent application Ser. Nos. 341,911 and 404,145 have been filed claiming the priority of the above identified Japanese patent applications, which however it is not hereby intended to admit as prior art to this application except as otherwise required by law. These types of variable swirl intake port construction incorporate two intake passages formed as leading to the port opening past the intake poppet valve into the combustion chamber of the engine, one of said passages leading substantially straight to said opening, and the other leading in a curved or helical path to said opening. The first or the straight one of said intake passages is controlled by an intake control valve mounted at an intermediate position therealong, so that its effective flow resistance is variable; and thus the relative amounts of intake flow which pass through said direct intake passage and said helical intake passage can be varied. In other words, when said intake control valve is closed to the maximum extent (i.e., in general, is fully closed), then a maximum proportion of the intake flow sucked in by the combustion chamber through the intake port construction is sucked in through the helical intake passage and a minimum proportion of said intake flow is sucked in through the straight intake passage, so that as a whole a maximum amount of swirling is imparted to the intake gas sucked into the combustion chamber. On the other hand, when said intake control valve is closed to the minimum extent (i.e., in general, is fully opened), then a minimum proportion of the intake flow sucked in by the combustion chamber through the intake port construction is sucked in through the helical intake passage and a maximum proportion of said intake flow is sucked in through the straight intake passage, so that as a whole a minimum amount of swirling is imparted to the intake gas sucked into the combustion chamber. Such a type of variable swirl intake port construction for an internal combustion engine is schematically shown in portions of FIGS. 1 and 2 of the accompanying drawings, and will be more fully explained in the portion of this specification entitled "DESCRIPTION OF THE PREFERRED EMBODIMENT".

When the intake flow into the combustion chamber of an internal combustion engine is imparted with a strong swirling, as in the above described case when the aforesaid intake control valve in the straight intake passage is closed as far as possible so that most or all of the intake flow of the engine passes through the helical intake passage, then the apparent flame propagation speed is increased, and it is possible to operate the engine with a very lean mixture, i.e. with a high air/fuel ratio. Further, strong intake swirling helps with stable idling of the engine, so that, other things being equal, the idling speed can be set very low, even when the air/fuel ratio of the mixture being supplied to the engine fluctuates somewhat. On the other hand, the intake volumetric efficiency is reduced, especially during relatively high engine load operation. But in the case when no or very little intake swirling is provided, as in the above described case when the aforesaid intake control valve in the straight intake passage is opened as far as possible so as to combine the flow through said straight intake passage with the flow through the helical intake passage, then the apparent flame propagation speed in the combustion chamber is lower and the engine cannot be operated on mixture of such a low air/fuel ratio, and the idling speed cannot be set so low and the idling is not so stable, but on the other hand the intake volumetric efficiency is much higher. Thus, in the above-identified previous applications, a general form of control method for the intake control valve has been to close it in the engine operational region from low to medium load, so as to substantially eliminate flow through said straight intake passage and to concentrate flow in said helical intake passage and so as to provide high swirling for the gases entering the combustion chamber, whereby in the low to medium load engine operational state the engine can be operated on a very high air/fuel ratio of about 18 to 20 or so—close to the maximum combustible air/fuel ratio; while on the other hand in the engine operational region from medium to high load it has been practiced to provide low swirling for the gases entering the combustion chamber by opening said intake control valve, so as to promote flow through said straight intake passage while reducing the amount of flow through said helical intake passage, and so as to increase volumetric efficiency, while of course the air/fuel ratio cannot be so high (i.e. lean) in this high engine load operational region.

Now, this basic form of control method for the intake control valve as described above has the advantages as just outlined, but, in the case that the intake control valve which controls the above division of the intake gases between the two intake passages is selectively moved to and fro by a vacuum actuator which operates according to selective supply of vacuum thereto, which is a very suitable and typical way for moving such an intake control valve due to the effectiveness of vacuum actuation, and in view of the fact that said vacuum is typically supplied from the intake manifold of the vehicle, the following shortcomings can occur.

In view of the fact that in the low engine load operating condition requiring the intake control valve to be closed a sufficiently great intake manifold vacuum is in general obtainable in the engine intake system, as compared with the generally contrary case in the high engine load operating condition, usually and conventionally it has been practiced to close the intake control valve (so as substantially to interrupt flow through said straight intake passage) by supplying its said vacuum actuator with the intake manifold vacuum, when the value of said vacuum in the intake manifold is greater than a certain vacuum value, in other words when the absolute pressure value in said intake manifold is below a certain absolute pressure value, and conversely to open the intake control valve (so as substantially to freely allow flow through said straight intake passage) by supplying its said vacuum actuator with air at atmospheric pressure, when the value of the vacuum in the intake manifold is less than said certain vacuum value, in other words when the absolute pressure value in said intake manifold is greater than said certain absolute pressure value. This form of control may for example be preformed by an electronic control device including a microcomputer. However, in order to produce a low level of harmful emissions in the exhaust gases of the engine, and in order for the engine to have good fuel economy, it is in fact desirable to operate the engine with high intake swirl, i.e. with the intake control valve closed so as to interrupt flow through the straight intake passage, over as wide a throttle opening range as practicable, and to this end sometimes it is desired for the intake control valve to be maintained as closed, even when the throttle valve has opened so far as to cause the intake manifold vacuum value to drop to such a low level as not properly to be able to keep said intake control valve in the closed state by being supplied to its vacuum actuator. To overcome this difficulty of possible lack of proper actuating vacuum in a certain operational range, it could be conceived of to provide a one way valve in the conduit which leads supply of vacuum to said vacuum actuator, so that, when the intake manifold vacuum value drops as engine load increased, this drop in intake manifold vacuum value is not transmitted to the diaphragm actuator; in other words, an actuating vacuum of sufficiently high vacuum value would be trapped in the diaphragm chamber of the diaphragm actuator, even when the throttle opening amount was so great that adequate vacuum for keeping the intake control valve was not actually available in the intake manifold, until said vacuum was intentionally released to the atmosphere by admission of air at atmospheric pressure into said disphragm chamber when it was definitely desired to open said intake control valve as throttle opening increased over a predetermined value. However, this conceivable solution is not by any means a fully satisfactory one, because of the following considerations. If from the high engine load condition with the intake control valve open the engine load drops until the throttle opening drops below said predetermined value, thereby producing an intake control valve closing command, nevertheless at this time a sufficient value of intake manifold vacuum for closing said intake control valve may not be available, and thereby the intake control valve may not be closed and accordingly the aforesaid intake control valve closing may not be properly obeyed. Such failure to obey an intake control valve closing command, apart from causing trouble by itself by not providing proper intake swirl in circumstances where it is desired, can have the following further troublesome consequences. If the control of the air/fuel ratio of the air - fuel mixture of the engine is being performed by taking into account the position of the intake control valve, which typically in such a control system as outlined above will be the case and may conveniently be being performed by the same microcomputer control system, then it will happen that, even though the intake control valve is not closed so as to produce high swirl in the combustion chamber, an air - fuel mixture of close to the maximum air/fuel ratio usable when the intake control valve is actually closed will be supplied to the engine, and in these circumstances in such absence of swirl there is a great risk of misfiring of the engine occurring. This can lead to severe loss of engine performance. Further, if the control of the ignition timing of the engine is similarly being performed by taking into account the valve opening and valve closing commands for the intake control valve, which again typically in such a system as outlined above may well be the case, then it will happen that proper ignition timing control fails—specifically the ignition timing may become drastically delayed from the proper timing—and again there is a great risk of severe loss of engine performance in these circumstances, as well as loss of drivability.

In other words, to be somewhat metaphorical, the primary problem is that the commands of the control device (such as a microcomputer) for the closing of the intake control valve are in the above outlined circumstances not properly obeyed, due to a lack of supply of vacuum for closingly moving said intake control valve, and this in itself is an undesirable thing; but a secondary, and more troublesome, problem is that despite this disobeying of the commands of the control device said control device thinks that its commands have in fact been obeyed and thinks that now the intake control valve has been closed, and based upon that assumption issues other orders relating to weakening of the air/fuel ratio of the air-fuel mixture and also relating to retardation of the ignition timing, which would be appropriate if the valve were closed but in fact are grossly inappropriate since it is not in fact closed, and, since these further orders are properly obeyed although the earlier valve closing order was not obeyed, much more serious consequences ensue.

SUMMARY OF THE INVENTION

Thus, in the case of utilization of such a variable swirl intake port construction for an internal combustion engine, a requirement has arisen for a method for control which is particularly well adapted thereto, and for a device for implementing the method.

Accordingly, it is the primary object of the present invention to provide a method and a device for control of a variable swirl type air-fuel intake system for an internal combustion engine of the type described above, which avoids the above identified problems.

It is a further object of the present invention to provide such a method and a device for control of a variable swirl type air-fuel intake system for an internal combustion engine, which ensure that lack of manifold vacuum for operating a control valve of such a straight passage portion of said variable swirl intake system never leads to improper engine operation.

It is a further object of the present invention to provide such a method and a device for control of such a variable swirl type air-fuel intake system for an internal combustion engine, which ensure that any valve closing control command signal for a control valve of such a straight passage portion of said variable swirl intake system is always obeyed properly and promptly, never being disobeyed.

It is a further object of the present invention to provide such a method and a device for control of a variable swirl type air-fuel intake system, which ensure that the air/fuel ratio of the air-fuel mixture supplied to the engine is never so over lean as to cause severe engine operation problems.

It is a further object of the present invention to provide such a method and a device for control of a variable swirl type air-fuel intake system, which ensure that the air/fuel ratio of the air-fuel mixture supplied to the engine is always substantially appropriate.

It is a further object of the present invention to provide such a method and a device for control of a variable swirl type air-fuel intake system, which prevent the possibility of erroneous ignition timing, and especially prevent the possibility of grossly retarded ignition timing.

It is a further object of the present invention to provide such a method and a device for control of a variable swirl type air-fuel intake system for an internal combustion engine, which prevent the occurrence of engine misfiring.

It is a further object of the present invention to provide such a method and a device for control of a variable swirl type air-fuel intake system for an internal combustion engine, which keep the performance of the engine high.

It is a yet further of the present invention to keep the drivability of the engine satisfactory.

It is a yet further object of the present invention to keep the idling operation of the engine satisfactory.

It is a yet further object of the present invention to promote good fuel economy of the engine.

It is a yet further object of the present invention to promote the quality of the exhaust emissions of the engine.

Now, according to the most general method aspect of the present invention, the abovementioned object is accomplished by, for an air-fuel mixture intake system, incorporated in an internal combustion engine having a cylinder head which defines a combustion chamber, comprising an intake port a downstream end of which opens to said combustion chamber and which includes a helical passage which extends helically around and towards its said downstream end and a straight passage which extends substantially straight towards its said downstream end, an intake passage switchover control valve system which is controllable so as to selectively alter the proportions of intake flow that pass through said straight passage and said helical passage, and a drive mechanism which when supplied with sufficient vacuum value controls said intake passage switchover control valve system so as to minimize the proportion of intake flow that passes through said straight passage and otherwise controls said intake passage switchover control value system so as to maximize the proportion of intake flow that passes through said straight passage: a method of control, wherein values representative of load and of intake pressure of said engine are detected, and wherein: when said value representative of engine load rises from below a certain determinate load value to above said certain determinate load value, a command is issued for said drive mechanism to control said intake passage switchover control valve system so as to maximize the proportion of intake flow that passes through said straight passage; and when said value representative of intake vacuum rises from below a certain determinate intake vacuum value to above said certain determinate intake vacuum value, a command is issued for said drive mechanism to control said intake passage switchover control valve system so as to minimize the proportion of intake flow that passes through said straight passage.

And also, according to the most general device aspect of the present invention, the abovementioned object is accomplished by, for an air-fuel mixture intake system, incorporated in an internal combustion engine having a cylinder head which defines a combustion chamber, comprising an intake port a downstream end of which opens to said combustion chamber and which includes a helical passage which extends helically around and towards its said downstream end and a straight passage which extends substantially straight towards its said downstream end, an intake passage switchover control valve system which is controllable so as to selectively alter the proportions of intake flow that pass through said straight passage and said helical passage, and a drive mechanism which when supplied with sufficient vacuum value controls said intake passage switchover control value system so as to minimize the proportion of intake flow that passes through said straight passage and otherwise controls said intake passage switchover control valve system so as to minimize the proportion of intake flow that passes through said straight passages: a control device, comprising: a means for detecting values representing of load end of intake pressure of said engine; a means for, when said valve representative of engine load rises form below a certain determinate load valve to above said certain determinate load value, issuing a command for said drive mechanism to control said intake passage switchover control valve system so as to maximize the proportion of intake flow that passes through said straight passage; and a means for, when said value representative of intake vacuum rises from below a certain determinate intake vacuum value to above said certain determinate intake vacuum value, issuing a command for said drive mechanism to control said intake passage switchover control valve system so as to minimize the proportion of intake flow that passes through said straight passage.

According to such a control method and device, because when the intake manifold vacuum is less than the predetermined value it is not sufficient for properly operating the drive mechanism which controls said intake passage switchover control valve system to close the straight intake passage, accordingly irrespective of the engine load (i.e. throttle opening amount) the command for said drive mechanism to control said intake passage switchover control valve system so as to minimize the proportion of intake flow that passes through said straight passage—i.e. to close said control valve system—is not issued, but this command is only issued when the intake vacuum rises to be above the certain determinate intake vacuum value, which is a value which is sufficient for thus properly operating the drive mechanism which controls said intake passage switchover control valve system to close it. Thereby, it is ensured that lack of manifold vacuum for operating the drive mechanism which controls said intake passage switchover control valve system never leads to improper engine operation, and that the closing control command signal for this valve system is always obeyed properly and promptly, never being disobeyed. Thus, it is ensured that the air/fuel ratio of the air - fuel mixture supplied to the engine is never so overly lean as to cause severe engine operation problems, and is always substantially appropriate. Also, the possibility of erroneous ignition timing such as grossly retarded ignition timing is prevented, thus preventing the occurrence of engine misfiring. Thereby, the performance of the engine is kept high, and the drivability of the engine is kept satisfactory, as well as its idling operation. And good fuel economy and good quality of the exhaust emissions of the engine are promoted.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are given purely for the purposes of explanation and exemplification only, and are not intended to be limitative of the scope of the present invention in any way, since the scope of the present invention is to be defined solely by the legitimate and proper scope of the appended claims. In the drawings:

FIG. 1 is a sectional view showing part of an internal combustion engine, which is equipped with an air-fuel intake system to be controlled according to the preferred method embodiment of the present invention which will be described, by the preferred apparatus embodiment of the present invention, the intake port construction of said engine incorporating a direct intake passage and a helical intake passage, as generally explained above;

FIG. 2 is a schematic sectional view through said intake port construction of the internal combustion engine of FIG. 1, taken in a plane substantially perpendicular to a relevant cylinder bore of said engine;

DESCRIPTION OF THE PREFERRED EMBODIMENT

Figure 3:
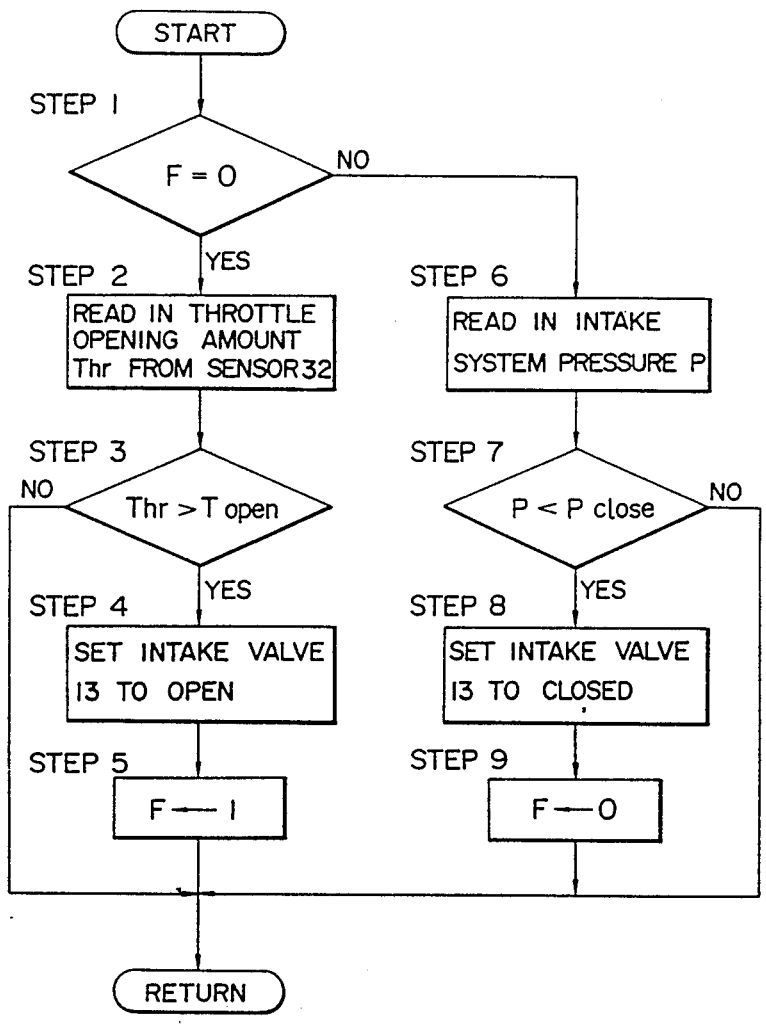
FIG. 3 is a flowchart of a routine stored in a control device for the actuation of a vacuum switching valve incorporated in the control system for the aforesaid intake port construction of the engine of FIG. 1, according to the preferred embodiment of the control method of the present invention, for moving an intake control valve in said intake port construction for providing intake air control.

The present invention will now be described with reference to the preferred embodiment thereof, and with reference to the appended drawings. Referring to FIG. 1, the reference numeral 1 denotes the internal combustion engine as a whole, and 2 is the cylinder block thereof, while 3 is its cylinder head. A piston 5 reciprocates in a bore 4 defined in the cylinder block 2, and between the cylinder head 3 and the piston 5 a combustion chamber 8 is defined. A spark plug 9 is fitted so as to provide ignition for fuel - air mixture in the combustion chamber 8, and is provided with electrical energy for sparking by a distributor 29, which receives said electrical energy from a coil 33 which is provided with a per se known igniter device 34.

First, the intake port construction of the internal combustion engine 1 shown in the drawing, which is of the sort described above incorporating a direct intake passage and a helical intake passage, will be explained in more detail. An intake port 7 is defined generally as a hole through the cylinder head 3, said intake port 7 leading from its upstream end which is an opening in the side wall of the cylinder head 3 to its downstream end which is an opening into the combustion chamber 8. The upstream end of the intake port 7 is connected to the downstream end of an intake manifold 23, and in the part of the cylinder head 3 which defines the circumferential periphery of the downstream end of the intake port 7 there is set a valve seat. The valve stem of an intake poppet valve 6 of a per se well known type is fitted in a valve guide which is set into the cylinder head 3; and the head portion of the intake poppet valve 6 cooperates with the intake valve seat in a per se known way selectively either to interrupt the opening through this intake valve seat and to discommunicate the intake port 7 from the combustion chamber 8 or alternatively to open said opening through said intake valve seat and communicate the intake port 7 with the combustion chamber 8. An exhaust port, an exhaust valve, and an exhaust valve seat are provided in the cylinder head 3, but they are not shown in the drawings.

The shape of the intake port 7, etc., will now be explained in brief detail; FIG. 2 should be referred to for a sectional view thereof. As a whole, said intake port 7 starts off at its upstream end as substantially straight, and becomes more and more bent along its downstream extent, and near its downstream end it is very substantially bent. The downstream portion of the roof (i.e. its side opposite to the valve seat) of said intake port 7 is formed with a longitudinally extending ridge or vane 10. The vane 10 has one side wall which defines in cooperation with the side wall of the intake port 7 a first intake passage 11, and an other side wall which defines in cooperation with the other side wall of the intake port 7 a second intake passage 12. The second intake passage 12 is substantially straight in its extent as leading from an upstream part of the intake port 7 (where the vane 10 substantially starts) to the opening through the valve seat which leads to the combustion chamber 8, so that flow of intake gas (i.e. air-fuel mixture) passing down said second intake passage 12 from said upstream part of the intake port 7 is introduced into the combustion chamber 8 without much swirl being imparted thereto. On the other hand, the first intake passage 11 leads in a helical fashion from said upstream part of the intake port 7 to said opening through the valve seat which leads to the combustion chamber 8, so that flow of gas passing down said first intake passage 11 from said upstream part of the intake port 7 is introduced into said combustion chamber 8 with very substantial swirl being imparted thereto. In fact, in this particular construction, the two intake passages 11 and 12 are not completely separated from one another; since the vane 10 does not extend completely across the intake port 7 (this cannot be seen in the figures, since the vane 10 does not fall in the sectional plane of FIG. 1); but this need not present any substantial problem.

An intake passage switchover control valve assembly 13 is provided for controlling the flow resistance of the second intake passage 12, i.e. of the straight one of the intake passages. This valve assembly 13 includes a valve element 13a of a flat paddle shape or butterfly valve shape which extends across the straight intake passage 12, and which is fixed to a valve shaft 14 which is rotatably supported in a valve shaft housing which is fixedly mounted in the cylinder head 3. A drive lever 15 is fixed to the protruding end of the valve shaft 14, so that when said drive lever 15 is rotated (by a drive system which will be explained hereinafter) the valve shaft 14 and the valve element 13a are likewise rotated and the orientation of the valve element 13a in the second intake passage 12 alters, thus opening or closing said second or straight intake passage 12. In one of its positions the valve element 13a substantially completely closes the second intake passage 12, but, when on the other hand the valve element 13a, the valve shaft 14, etc., are rotated through about 90° from this position, then the valve element 13a leaves said second intake passage 12 substantially unobstructed.

Thus, considering the operation when the internal combustion engine is running: when the butterfly valve element 13a of the valve assembly 13 is in its said position to substantially completely close the second straight intake passage 12, which will hereinafter be termed its first position, then most of the intake flow through the intake port 7 passes down the first or helical intake passage 11 (except for some of said flow which passes under the vane 10 from the point of view of FIG. 1), and this intake flow is given a relatively strong swirling action by the curved helical shape of this first intake passage 11, as it passes through the opening in the valve seat into the combustion chamber 8. Accordingly, the apparent flame speed in the combustion chamber 8 is increased by this swirling of the fuel/air mixture therein. Accordingly the combustion speed in the combustion chamber 8 is relatively high. But on the other hand the resistance to gas flow of the intake port 7 as a whole, in this operational mode, is rather high.

But when the butterfly valve element 13a of the valve assembly 13 is rotated by 90° from its said first position, so as now to substantially completely open the second straight intake passage 12, which will hereinafter be termed its second position, then a large proportion of the intake flow through the intake port 7 passes down said second straight intake passage 12, although a minor part will still pass down the first or helical intake passage 11 (and also some of said flow will still pass below the vane 10), and the intake flow through this second straight intake passage 12 is not given any strong swirling action, as it passes through the opening in the valve seat into the combustion chamber 8, since this intake passage 12 is straight; although the minor portion of the intake flow which is still passing down the first intake passage 11 is still imparted with some swirl by the curved shape of this first intake passage 11. Accordingly, as a whole the intake flow into the combustion chamber 8 does not swirl very much, so that the apparent flame speed in the combustion chamber 8 is lower than in the previous case described above. Further, the combustion speed is relatively low. But on the other hand the resistance to gas flow of the intake port 7 as a whole, in this operational mode, is much lower than in the previous case.

Finally, as a matter of course, when the butterfly valve element 13a of the valve assembly 13 is rotated to an intermediate position between its said first position and its said second position, so as to partly open the second straight intake passage 12, then a medium proportion of the intake flow through the intake port 7 passes down said second straight intake passage 12, and another medium part will still pass down the first or helical intake passage 11 (and also some of said flow will still pass below the vane 10); and, while the portion of the intake flow which is passing through this second straight intake passage 12 is not being given any strong swirling action as it passes through the opening in the valve seat into the combustion chamber 8 since this intake passage 12 is straight, on the other hand the portion of the intake flow which is still passing down the first intake passage 11 is still imparted with some relatively strong swirl by the curved shape of this first intake passage 11. Accordingly, as a whole the intake flow into the combustion chamber 8 is imparted with a medium amount of swirl, so that the apparent flame speed in the combustion chamber 8 is intermediate between the two extreme cases described above. Further, the combustion speed is also intermediate. Also the resistance to gas flow of the intake port 7 as a whole, in this intermediate operational mode, is likewise intermediate.

. The butterfly valve element 13a is driven, via the valve shaft 14 and the drive lever 15, by an actuator rod 17 which extends from a vacuum operated diaphragm actuator 16, and this diaphragm actuator 16, according to selective supply of actuating vacuum to it, operates so as to move the butterfly valve element 13a of the valve assembly 13 either to its above described second position, in which it substantially completely opens the second straight intake passage 12 so that as described above a large proportion of the intake flow through the intake port 7 passes down said second straight intake passage 12 with a minor part still passing down the first or helical intake passage 11, or to its above described first position, in which it substantially completely closes the second straight intake passage 12 so that as described above a large proportion of the intake flow through the intake port 7 passes down said first or helical intake passage 11. In detail, when a vacuum chamber (not particularly shown) of the vacuum actuator 16 is supplied with a vacuum value higher (i.e. of lower absolute pressure) than a certain predetermined value, then the rod 17 moves the element 13a of the valve assembly 13 to its first position in which it closes the straight intake passage 12, and on the other hand when said vacuum chamber of the vacuum actuator 16 is supplied with a vacuum value lower (i.e. of higher absolute pressure) than said certain predetermined value, then the rod 17 moves the element 13a of the valve assembly 13 to its second position in which it opens the straight intake passage 12.

The vacuum actuator 16 is selectively supplied with actuating vacuum through a vacuum conduit 18 from a port "a" of an electromagnetic vacuum switching valve 19. This electromagnetic vacuum switching valve 19 has two other ports "b" and "c". The port "b" is communicated to a vacuum port 25 opening into an anti surge tank 24 provided upstream of the intake manifold 23 via a conduit 20, a one way valve 21, and another vacuum conduit 22, and thus receives a continuous supply of manifold vacuum while the engine 1 is running, while the port "c" is communicated to the atmosphere. When the electromagnetic vacuum switching valve 19 is not supplied with actuating electrical energy, then its port "a" is communicated to its port "c" while its port "b" is communicated to no other port, while on the other hand when the electromagnetic vacuum switching valve 19 is supplied with actuating electrical energy its port "a" is communicated to its port "b" while its port "c" is communicated to no other port. And the one way valve 21 is for sealing negative pressure into the diaphragm chamber of the diaphragm device 16, so that, once the negative pressure in the surge tank 24 has become sufficiently great (i.e. of sufficiently low absolute value) to cause the operation of said diaphragm device 16 with the ports a and b of the electromagnetic vacuum switching valve 19 communicated together, then, even if subsequently said negative pressure in said surge tank 24 drops (i.e. its absolute value rises) to a pressure value which would cause said diaphragm device 16 to stop operating if supplied thereto, nevertheless the diaphragm device 16 continues to operate, as long as said ports a and b of the electromagnetic vacuum switching valve 19 remain communicated together, with the previously high vacuum value trapped inside said diaphragm chamber of said diaphragm device 16 by the action of the one way valve 21.

Upstream of the intake side of the anti surge tank 24 there is rotatably mounted a throttle valve 26, and a fuel injection nozzle 27 opens into a downstream part of the intake manifold 23 so as, when supplied from a supply system not particularly shown with pressurized fuel (such as gasoline), and when opened, to direct a spirt of injected fuel in an amount corresponding to the desired fuel injection amount into the intake manifold 23.

An electronic control device 30 supplies actuating electrical control signals for the opening and closing of the fuel injection nozzle 27, for the actuation of the electromagnetic vacuum switching valve 19, and for the control of ignition timing by the igniter 34, and possibly for other devices. This electronic control device 30 receives input of information relating to throttle opening amount from an accelerator pedal opening amount sensor 32 which is coupled to the movement of the throttle valve 26, of information relating to intake system pressure from an intake system pressure sensor 31 which is fed with the pressure within the surge tank 24, of information relating to engine rotational speed from an engine rotational speed detector (not particularly shown) fitted to the distributor 29, and possibly of other information from other devices. Based upon this information, and possibly upon said other information which it may receive, the electronic control device 30, which in this preferred embodiment of the present invention comprises a microcomputer which operates according to various stored programs in its memory, calculates the output signals for the opening and closing of the fuel injection nozzle 27, i.e. for fuel injection, for the actuation of the electromagnetic vacuum switching valve 19, i.e. for the control of the intake passage switchover control valve assembly 13, and for the control of ignition timing by the igniter 34.

The method of control for the electromagnetic vacuum switching valve 19, i.e. for the control of the intake passage switchover control valve assembly 13, provided by the electronic control device 30 according to the preferred embodiment of the control method of the present invention, will now be described in more detail, with reference to FIG. 3 which is a flowchart of the subroutine stored in said control device 30 for the actuation of said vacuum switching valve 19. This subroutine is a subroutine which is executed repeatedly, either as a part of the main program of the microcomputer of the electronic control device 30, or according to interrupts at fixed time intervals.

In step 1 after the start of the FIG. 3 subroutine, a decision is made as to whether the value of a flag F is zero, or not. This flag F is for indicating the current set state of the intake passage switchover control valve assembly 13, and, if the current value of said flag F is zero, then this indicates that said valve assembly 13 is currently in the closed state so as to force most of the intake flow through the intake port 7 to pass down the first or helical intake passage 11, so that the intake flow is being given a relatively strong swirling action by the curved helical shape of this first intake passage 11 and so that the apparent flame speed in the combustion chamber 8 is being maintained as relatively high with the flow resistance of the intake port 7 as a whole also relatively high, i.e., at the present time electrical energy is being supplied by the control system 30 to the electromagnetic switching valve 19 so as to cause it to commuinicate its ports "a" and "b" together so as to supply manifold vacuum to the diaphragm chamber of the diaphragm device 16 via the conduits 18, 20, and 22 and the one way valve 21; while, on the other hand, if the value of this flag F is unity, then this indicates that said valve assembly 13 is currently in the open state so as to allow a large part of the intake flow through the intake port 7 to pass down the straight intake passage 11, so that as a whole the intake flow is not being given a particularly strong swirling action, and so that the apparent flame speed in the combustion chamber 8 is being maintained as relatively low with the flow resistance of the intake port 7 as a whole also relatively low, i.e., at the present time electrical energy is not being supplied by the control system 30 to the electromagnetic switching valve 19, so as to cause it to communicate its ports "a" and "c" together so as to supply air at atmospheric pressure to the diaphragm chamber of the diaphragm device 16 via the conduit 18. Thus, in this step 1, if the value of the flag F is zero, then the flow of control passes to the step 2, while if the value of F is non zero (i.e. unity) then the flow of control passes to the step 6.

Now, in this step 2, which as explained above is only reached if it is determined that the valve assembly 13 is currently in the closed state, the action is performed of reading into the memory (such as the random access memory or RAM) of the electronic control device 30 a value Thr representative of the output of the accelerator pedal opening amount sensor 32 which represents the position of the throttle valve 26. Then the flow of control passes to the step 3.

In this step 3, a decision is made as to whether this value Thr is greater than a certain determinate threshold value Topen, or not. If the result of this decision is YES, so that Thr is indeed greater than Topen, then the flow of control passes next to the step 4; whereas if the result of this decision is NO, so that Thr is less than (or equal to) Topen, then the flow of control passes next to the end of the FIG. 3 subroutine, to return and later to perform this subroutine again.

In the step 4, which as explained above is only reached if it is determined that the throttle opening value Thr is greater than the certain determinate threshold value Topen, a valve opening control command for the intake passage switchover control valve assembly 13 is issued, i.e. a flip flop or the like (not shown) is set by the electrical control device 30 so as to stop supplying electrical energy to the electromagnetic switching valve 19 so as to cause it now to communicate its ports "a" and "c" together so as to supply atmospheric air to the diaphragm chamber of the diaphragm device 16 via the conduit 18, so that said valve assembly 13 is now set so as to be in the open state so as now to allow a large part of the intake flow through the intake port 7 to pass down the straight intake passage 11 so that as a whole the intake flow is now stopped from being given any particularly strong swirling action and so that the apparent flame speed in the combustion chamber 8 now begins to be relatively low with the flow resistance of the intake port 7 as a whole also relatively low. Then the flow of control passes to the step 5, in which the value of F is set to unity so as to reflect this new open condition for the intake passage switchover control valve assembly 13; and then the flow of control passes next to the end of the FIG. 3 subroutine, to return and later to perform this subroutine again.

On the other hand, in the step 6, which as explained above is only reached if it is determined that the valve assembly 13 is currently in the open state with the valve of the flag F non zero, the action is performed of reading into the memory such as the random access memory or RAM of the electronic control device 30 a value P representative of the output of the intake system pressure sensor 31 which is fed with the pressure within the surge tank 24, and then the flow of control passes to the step 7.

In this step 7, a decision is made as to whether this value P is less than a certain determinate threshold value Pclose, or not. If the result of this decision is YES, so that P is indeed less than Pclose, then the flow of control passes next to the step 8; whereas if the result of this decision is NO, so that P is greater than (or equal to) Pclose, then the flow of control passes next to the end of the FIG. 3 subroutine, to return and later to perform this subroutine again.

In the step 8, which as explained above is only reached if it is determined that the intake system vacuum value P is less than the certain determinate threshold value Pclose, a valve closing control command for the intake passage switchover control valve assembly 13 is issued, i.e. the aforementioned flip flop or the like (not shown) is set by the electrical control device 30 so as to start supplying electrical energy to the electromagnetic switching valve 19 so as to cause it now to communicate its ports "a" and "b" together so as now to supply manifold vacuum to the diaphragm chamber of the diaphragm device 16 via the conduits 18, 20, and 22 and the one way valve 21, so that said valve assembly 13 is now set so as to be in the closed state so as now to force most of the intake flow through the intake port 7 to pass down the first or helical intake passage 11 so that as a whole the intake flow is now started to be given a particularly strong swirling action and so that the apparent flame speed in the combustion chamber 8 now begins to be relatively high with the flow resistance of the intake port 7 as a whole also relatively high. Then the flow of control passes to the step 9, in which the value of F is set to zero so as to reflect this new closed condition for the intake passage switchover control valve assembly 13; and then the flow of control again passes next to the end of the FIG. 3 subroutine, to return and later to perform this subroutine again.

The effect of this control method is to alter the state of the intake passage switchover control valve assembly 13 from closed to open, when the value Thr of the throttle opening of the vehicle rises to be greater than the determinate value Topen, while on the other hand to alter the state of the intake passage switchover control valve assembly 13 from open to closed, when the value P of the pressure in the intake system of the vehicle drops to be less than the determinate value Pclose. In other words, the control of the valve assembly 13 to open it is performed according to the throttle opening amount Thr, while on the other hand the control of the valve assembly 13 to close it is performed according to the intake system vacuum value P. Now, during this process of closing the control valve assembly 13, when as stipulated above the value P of the pressure in the intake system of the vehicle drops to be less than the determinate value Pclose and hence is quite low and is definitely low enough to close the control valve assembly 13 by being supplied to the diaphragm device 16, actuating electrical energy is supplied to the electromagnetic coil of the electromagnetic switching valve 19, so as to connect its port "a" to its port "b", with the result that the manifold vacuum currently present in the surge tank 24 is in fact supplied via the conduits 22, 20, and 18 to the diaphragm chamber of the diaphragm device 16, thus definitely causing the valve assembly 13 to be closed. And subsequently, by the action of the one way valve 21, this negative pressure is sealed into the diaphragm chamber of the diaphragm device 16, so that the valve assembly 13 is definitely kept in its closed state, even if, as the throttle opening amount Thr rises to be quite close to the determinate threshold value Topen which would cause said valve assembly 13 to be opened, the actual current value of the intake system pressure P drops to be lower than the minimum value which is sufficient for activating the valve assembly 13. Thus, it is ensured that the value assembly 13 is not prematurely opened, due to lack of atuating negative pressure therefor.

And, because it is definitely ensured that the command for closing of the valve assembly 13 (in the step 8 of the FIG. 3 subroutine) is not issued, until definitely the value P of the pressure in the intake system of the vehicle has dropped to be less than the determinate value Pclose and hence is definitely low enough to close the control valve assembly 13 by being supplied to the diaphragm device 16, thereby it is ensured that this valve assembly closing command is always promptly and efficiently implemented, and accordingly it is guaranteed that the value of the flag F as set by the FIG. 3 subroutine is always properly indicative of the actual open or closed condition of the valve assembly 13. As will be seen shortly with reference to the FIG. 4 subroutine, this value of the flag F is used in other places in the program of the microcomputer of the control device 30, for deciding whether or not the valve assembly 13 is actually in the opened or the closed state, and accordingly it is of the greatest importance that the value of the flag F should properly be reflective of the actual state of the valve assembly 13, because otherwise certain severely undesirable consequences can arise as specified in earlier portions of this specification. Providing this assurance of always proper setting of the flag F is one of the chief merits of the concept of the present invention.

Figure 4:
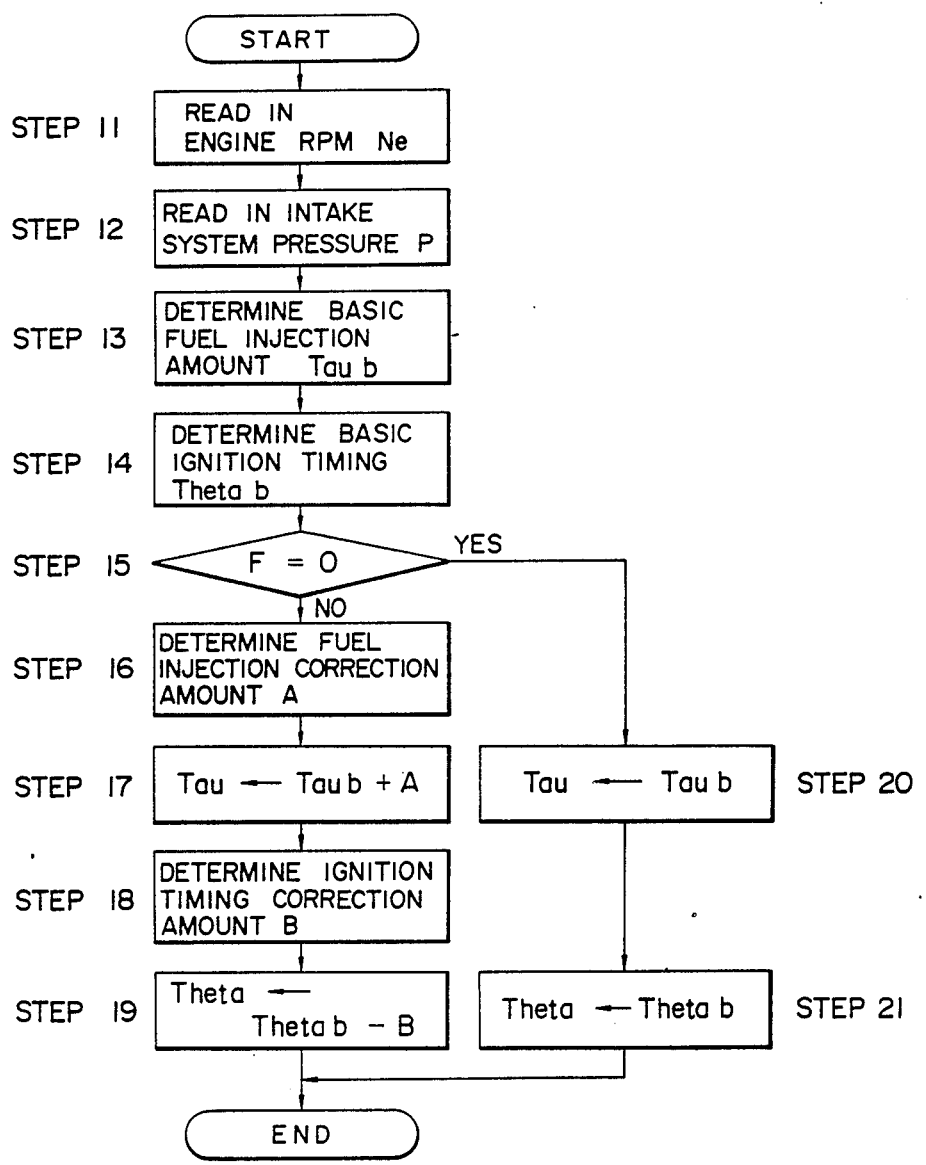
FIG. 4 is a flowchart of a control routine, also stored in said control device, for concurrent control, along with said intake air controlling according to the present invention, of air-fuel mixture air/fuel ratio and of ignition timing.

Now, a particular possible method of control provided by the electronic control device 30 for the amount of fuel for injection through the fuel injection nozzle 27 and for the ignition timing for the engine 1 as provided by the igniter 34 will now be described, with particular reference to the subroutine whose flow chart is shown in FIG. 4. These forms of control are explained herein to show that the value of the flag F, set by the FIG. 3 subroutine, can be effectively used elsewhere in the operation of the microcomputer of the control device 30 for deciding whether or not the valve assembly 13 is actually in the opened or the closed state, since as explained above said value of the flag F can definitely be relied upon.

In the step 11 of this subroutine, the action is performed of reading into the memory (such as the random access memory or RAM) of the electronic control device 30 a value Ne representative of the revolution speed of the engine 1; this value may be determined from a signal from the distributor 29 as schematically indicated in FIG. 1, and in such a case this step 11 may in fact consist of comparing times of interrupts caused by this distributor signal 29, or the like. Then the flow of control passes to the step 12, in which the action is performed of reading into the memory of the electronic control device 30 a value P representative of the output of the intake system pressure sensor 31 which is fed with the pressure within the surge tank 24 (this step 12 in fact performs the same action as the step 6 of the FIG. 3 subroutine, and in practice their operations may be combined in some fashion), and then the flow of control passes to the step 13.

In this step 13, a basic value Taub for the amount of fuel to be injected in the next fuel injection spirt through the fuel injection valve 27 into the intake manifold 23 is determined by the electronic control device 30, from the above read in pressure P in the intake manifold and engine revolution speed Ne. Typically this is done by table lookup; the memory (such as read only memory or ROM) of the electronic control device 30 has stored in it a table of values for this basic fuel injection amount Taub as a function of the pressure P in the intake manifold and of the engine revolution speed Ne, and this table is looked up from. This basic fuel injection amount is a fuel injection amount corresponding to the optimum air/fuel ratio for the injected air-fuel mixture in the case that the intake control valve assembly 13 is in the closed condition, thus providing maximum intake swirl with relatively low volumetric efficiency. Next, the flow of control passes to the step 14.

In this step 14, a basic value Thetab for the ignition timing is determined by the electronic control device 30, again from the above read in pressure P in the intake manifold and engine revolution speed Ne. Typically again this is done by table lookup; the memory (such as read only memory or ROM) of the electronic control device 30 has stored in it a table of values for this basic ignition timing Thetab as a function of the pressure P in the intake manifold and of the engine revolution speed Ne, and this table is looked up from. This basic ignition timing is again an ignition timing corresponding to the optimum ignition timing in the case that the intake control valve assembly 13 is in the closed condition. Next, the flow of control passes to the step 15.

In this step 15, a decision is made as to whether the value of the flag F, set as explained above by the FIG. 3 subroutine according to whether or not actually the intake control valve assembly 13 is currently in the closed condition, is zero, or not. As explained above, because of the implementation of the principle of the present invention as explained in the description of the FIG. 3 subroutine, the value of this flag F can always be relied upon. If the result of this decision is YES, so that in fact the intake control valve assembly 13 is currently in the closed condition, then the flow of control passes next to the step 20; whereas if the result of this decision is NO, so that in fact the intake control valve assembly 13 is currently in the open condition, then the flow of control passes next to the step 16.

In this step 16, a correction amount A for the fuel injection amount in this case of the intake control valve assembly 13 being in the open condition is determined. Depending upon the particular details of implementation, not to be discussed herein, this fuel injection correction amount A could be a constant selected according to the desired air/fuel ratio characteristics of the internal combustion engine 1, or could be determined according to only one of the pressure P in the intake manifold and the engine revolution speed Ne by lookup from a vector or by calculation by using a function or the like, or could be determined according to both of the pressure P in the intake manifold and the engine revolution speed Ne by lookup from a two dimensional table or by calculation by using a function of two variables or the like. After the determination of the fuel injection correction amount A, the flow of control proceeds to the step 17.

In this step 17, this correction amount A for the fuel injection amount in this case of the intake control valve assembly 13 being in the open condition is added to the basic value Taub for the amount of fuel to be injected in the case that the intake control valve assembly 13 is in the closed condition, to produce the actual fuel injection amount Tau to be used in this case of the intake control valve assembly 13 being in the open condition. And next the flow of control proceeds to the step 18.

In this step 18, a correction amount B for the ignition timing in this case of the intake control valve assembly 13 being in the open condition is determined. Again, depending upon the particular details of implementation, not to be discussed herein, this ignition timing correction amount B could be a constant selected according to the desired ignition timing characteristics of the internal combustion engine 1, or could be determined according to only one of the pressure P in the intake manifold and the engine revolution speed Ne by lookup from a vector or by calculation by using a function or the like, or could be determined according to both of the pressure P in the intake manifold and the engine revolution speed Ne by lookup from a two dimensional table or by calculation by using a function of two variables or the like. After the determination of the ignition timing correction amount B, the flow of control proceeds to the step 19.

In this step 19, this correction amount B for the ignition timing in this case of the intake control valve assembly 13 being in the open condition is substracted from the basic value Thetab for the ignition timing in the case that the intake control valve assembly 13 is in the closed condition, to produce the actual ignition timing value Theta to be used in this case of the intake control valve assembly 13 being in the open condition. Thus, both the proper fuel injection amount Tau and the proper ignition timing Theta are determined in this open intake control valve case. And finally the flow of control proceeds to exit the FIG. 4 subroutine, to some other control subroutine which performs the actual fuel injection and the actual ignition timing setting, which will not be particularly discussed herein.

On the other hand, if the flow of control reaches the step 20, then it is determined that the intake control valve assembly 13 being in the closed condition, and in this case the already determined values Taub for the amount of fuel to be injected in the case that the intake control valve assembly 13 is in the closed condition and Thetab for the ignition timing in said case that the intake control valve assembly 13 is in the closed condition, will be appropriate as they stand for using for fuel injection and for ignition timing. Hence, in this step 20, the value Taub is assigned to the actual fuel injection amount Tau to be used, and then control proceeds to the step 21, in which similarly the value Thetab is assigned to the actual ignition timing value Theta to be used, and then as before the flow of control proceeds to exit the FIG. 4 subroutine, to some other control subroutine which performs the actual fuel injection and the actual ignition timing setting, as mentioned above.

Thus, by the control operation of this FIG. 4 subroutine as described above, both in the cases of the intake control valve 13 being opened and being closed, appropriate values Tau and Theta for the amount of fuel to be injected and for the ignition timing are calculated, to be later used. And during the above control process the value of the flag F set by the FIG. 3 subroutine is used as an indication as to whether said intake control valve 13 is actually opened or closed. Accordingly, the accuracy given to this indication provided by the flag F by the principle of the present invention is of the highest importance for ensuring that correct and appropriate values for Tau and for Theta are calculated by this FIG. 4 subroutine.

Thus, according to the shown control method and device, because when the intake manifold vacuum is less than the predetermined value Pclose it is not sufficient for properly operating the drive mechanism comprising the diaphragm device 16 to cause the valve assembly 13 to close the straight intake passage 12, accordingly irrespective of the throttle opening amount the command for said drive mechanism to close said valve assembly 13 is not issued, but this command is only issued when the intake vacuum rises to be above the certain determinate intake vacuum value Pclose, which is a value which is sufficient for thus properly operating the diaphragm device 16 to close the valve assembly 13. Thereby, it is ensured that lack of manifold vacuum for operating the diaphragm device 16 never leads to improper engine operation, and that the closing control command signal for the valve assembly 13 is always obeyed properly and promptly, never being disobeyed. Thus, it is ensured that the air/fuel ratio of the air - fuel mixture supplied to the engine is never so over lean as to cause severe engine operation problems, and is always substantially appropriate. Also, the possibility of erroneous ignition timing such as grossly retarded ignition timing is prevented, thus preventing the occurrence of engine misfiring. Thereby, the performance of the engine is kept high, and the drivability of the engine is kept satisfactory, as well as its idling operation. And good fuel economy and good quality of the exhaust emissions of the engine are promoted.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. For an air-fuel mixture intake system, incorporated in an internal combustion engine having a cylinder head which defines a combustion chamber, comprising an intake port, a downstream end of which opens to said combustion chamber and which includes a helical passage which extends helically around and toward said downstream end and straight passage which extends substantially straight toward said downstream end, and an intake passage switchover control valve which is convertible between a first position wherein the proportion of intake flow which passes through said straight passage relative to intake flow which passes through said helical passage is minimized, and a second position wherein said proportion is maximized, a control device comprising:
  a valve drive system including diaphragm means adapted to be actuated by intake vacuum present in an intake manifold of the engine so as to drive said intake passage switchover control valve to said first position when supplied with a certain determinate or greater level of intake vacuum and to drive said intake passage switchover control valve to said second position when supplied with atmospheric pressure, a vacuum switching valve for selectively either connecting said diaphragm means to said intake manifold or releasing said diaphragm means to the atmosphere, and a one way valve provided between said vacuum switching valve and said intake manifold so as to hold vacuum on one side thereof toward said diaphragm means;
  first means for detecting throttle opening;
  second means for detecting vacuum level present in the intake manifold of the engine;
  third means for, when said throttle opening detected by said first means increases from below a certain determinate opening value to or above said certain determinate opening value, issuing a first command for said valve drive system to switchover said vacuum switching valve so as to release said diaphragm means to the atmosphere; and
  fourth means for, when said vacuum level present in the intake manifold of the engine detected by said second means rises from below said certain determinate vacuum level to or above said certain determinate vacuum level, issuing a second command for said valve drive system to switchover said vacuum switching valve so as to connect said diaphragm means to the intake manifold of the engine; and further comprising an electronic control routine system which includes means for detecting first and second values of a flag, a first subrouting system which operates said third means for issuing said first command as long as said flag has said first value, and a second subroutine system which operates said fourth means for issuing said second command as long as said flag has said second value, said third means setting said flag to said second value upon issuance of said first command, and said fourth means setting said flag to said first value upon issuance of said second command.

* * * * *